US008626748B2

(12) United States Patent
McDougall

(10) Patent No.: US 8,626,748 B2
(45) Date of Patent: Jan. 7, 2014

(54) COMBINED WORD TREE TEXT VISUALIZATION SYSTEM

(75) Inventor: Steven R. McDougall, Kanata (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/365,918

(22) Filed: Feb. 3, 2012

(65) Prior Publication Data

US 2013/0204897 A1 Aug. 8, 2013

(51) Int. Cl.
*G06F 17/30* (2006.01)
(52) U.S. Cl.
USPC ............................ 707/721; 715/227
(58) Field of Classification Search
USPC ................... 707/721, 722; 715/227
See application file for complete search history.

(56) References Cited

U.S. PATENT DOCUMENTS

| 7,054,878 | B2 | 5/2006 | Gottsman et al. |
| 7,373,612 | B2 | 5/2008 | Risch et al. |
| 7,475,072 | B1 | 1/2009 | Ershov |
| 2009/0013281 | A1 | 1/2009 | Helfman et al. |
| 2011/0047455 | A1 | 2/2011 | Funes et al. |

OTHER PUBLICATIONS

Collins et al. "DocuBurst: Visualizing Document Content using Language Structure", Eurographics/IEEE-VGTC Symposium on Visualization 2009, vol. 28, No. 3, The Eurographics Association and Blackwell Publishing Ltd., 2009, 8 pgs.
Culy et al. "Double Tree: an advanced KWIC visualization for expert users", 2010 14th International Conference Information Visualisation, IEEE, 2010, 6 pgs.
Stasko et al. "Jigsaw: supporting investigative analysis through interactive visualization", Information Visualization (2008) 7, 118-132, Palgrave Macmillan Ltd., 2008, 15 pgs.
Weiss-Lijn et al. "Supporting document use through interactive visualization of metadata", available at http://vw.indiana.edu/visual01/weiss-lijn-et-al.pdf (accessed Feb. 3, 2012), 2001, 6 pgs.
Viegas et al. "Many Eyes: A Site for Visualization at Internet Scale", IEEE Transactions on Visualization and Computer Graphics, vol. 13, No. 6, Nov./Dec. 2007, 1121-1128 pgs.
Wattenberg et al. "The Word Tree, an Interactive Visual Concordance" IEEE Transactions on Visualization and Computer Graphics, vol. 14, No. 6, Nov./Dec. 2008 (8 pages).

*Primary Examiner* — William Spieler
(74) *Attorney, Agent, or Firm* — Shumaker & Sieffert, P.A.

(57) ABSTRACT

An example method includes identifying instances of a search term in a source text, and identifying prefix strings and suffix strings comprising tokens preceding and subsequent to the search term in the source text. The method further includes displaying a visualization interface that includes the search term within a combined tree diagram that includes a prefix tree and a suffix tree extending to either side of the search term. The prefix tree displays the prefix strings and the suffix tree displays the suffix strings, and both have user-selectable branches. The method further includes providing, in response to a user input selecting a branch in the prefix tree or in the suffix tree, a visual indication of a prefix string and a suffix string in the visualization interface that form a matching sequence that originate together in the source text, for matching sequences that are connected through the selected branch.

19 Claims, 7 Drawing Sheets

COMBINED WORD TREE TEXT VISUALIZATION SYSTEM

TECHNICAL FIELD

The disclosure relates to information visualizations, and particularly to computing devices providing information visualizations.

BACKGROUND

Computing systems have been used in various ways to search and analyze text. This includes searches for individual words or phrases or strings of multiple words, as well as visualizations that provide additional context or information.

SUMMARY

In one example, a method includes receiving a search term and identifying instances of the search term in a source text. The method further includes, for each of the instances of the search term identified in the source text, identifying a prefix string comprising a plurality of tokens preceding the search term in the source text, and identifying a suffix string comprising a plurality of tokens subsequent to the search term in the source text. The method further includes providing data to display a visualization interface that includes the search term within a combined tree diagram that includes a prefix tree extending to a first side of the search term, and a suffix tree extending to a second side of the search term. The prefix tree displays, in a tree diagram format, the prefix strings for the instances of the search term identified in the source text, and the suffix tree displays, in a tree diagram format, the suffix strings for the instances of the search term identified in the source text. The prefix tree includes tokens that are shared in common among the prefix strings as nodes connected to adjacent tokens by branches, and the suffix tree likewise includes tokens that are shared in common among the suffix strings as nodes connected to adjacent tokens by branches. The branches in the prefix tree and the suffix tree are user-selectable in the visualization interface. The method further includes providing, in response to receiving a user input selecting one of the branches in the prefix tree or in the suffix tree, data to display a visual indication of a prefix string and a suffix string in the visualization interface that form a matching sequence of prefix string, search term, and suffix string that originate together in the source text, for each of one or more matching sequences that are connected through the selected branch.

In another example, a computing system includes one or more processors, one or more computer-readable tangible storage devices, a display device; and a user input device. The computing system also includes program instructions, stored on at least one of the one or more computer-readable tangible storage devices for execution by at least one of the one or more processors, to receive a search term. The computing system also includes program instructions, stored on at least one of the one or more computer-readable tangible storage devices for execution by at least one of the one or more processors, to identify instances of the search term in a source text. The computing system also includes program instructions, stored on at least one of the one or more computer-readable tangible storage devices for execution by at least one of the one or more processors, to identify, for each of the instances of the search term identified in the source text, a prefix string comprising a plurality of tokens preceding the search term in the source text, and to identify a suffix string comprising a plurality of tokens subsequent to the search term in the source text. The computing system also includes program instructions, stored on at least one of the one or more computer-readable tangible storage devices for execution by at least one of the one or more processors, to provide data to display on the display device a visualization interface that comprises the search term within a combined tree diagram comprising a prefix tree extending to a first side of the search term, and a suffix tree extending to a second side of the search term, such that the prefix tree displays, in a tree diagram format, the prefix strings for the instances of the search term identified in the source text, and the suffix tree displays, in a tree diagram format, the suffix strings for the instances of the search term identified in the source text, wherein the prefix tree comprises tokens that are shared in common among the prefix strings as nodes connected to adjacent tokens by branches, and the suffix tree comprises tokens that are shared in common among the suffix strings as nodes connected to adjacent tokens by branches, wherein the branches in the prefix tree and the suffix tree are user-selectable in the visualization interface. The computing system also includes program instructions, stored on at least one of the one or more computer-readable tangible storage devices for execution by at least one of the one or more processors, to provide, in response to receiving, through the user input device, a user input selecting one of the branches in the prefix tree or in the suffix tree, data to display a visual indication of a prefix string and a suffix string in the visualization interface that form a matching sequence of prefix string, search term, and suffix string that originate together in the source text, for each of one or more matching sequences that are connected through the selected branch.

In another example, a computer program product includes one or more computer-readable tangible storage devices and program instructions stored on at least one of the one or more computer-readable tangible storage devices. The computer program product includes program instructions, stored on at least one of the one or more computer-readable tangible storage devices, to receive a search term. The computer program product further includes program instructions, stored on at least one of the one or more computer-readable tangible storage devices, to identify instances of the search term in a source text. The computer program product further includes program instructions, stored on at least one of the one or more computer-readable tangible storage devices, to identify, for each of the instances of the search term identified in the source text, a prefix string comprising a plurality of tokens preceding the search term in the source text, and to identify a suffix string comprising a plurality of tokens subsequent to the search term in the source text. The computer program product further includes program instructions, stored on at least one of the one or more computer-readable tangible storage devices, to provide data to display a visualization interface that comprises the search term within a combined tree diagram comprising a prefix tree extending to a first side of the search term, and a suffix tree extending to a second side of the search term, such that the prefix tree displays, in a tree diagram format, the prefix strings for the instances of the search term identified in the source text, and the suffix tree displays, in a tree diagram format, the suffix strings for the instances of the search term identified in the source text, wherein the prefix tree comprises tokens that are shared in common among the prefix strings as nodes connected to adjacent tokens by branches, and the suffix tree comprises tokens that are shared in common among the suffix strings as nodes connected to adjacent tokens by branches, wherein the branches in the prefix tree and the suffix tree are user-selectable in the visualization interface. The computer program product further includes program instructions, stored on at least one of the one or more computer-readable tangible storage devices, to provide, in response to receiving a user input selecting one of the branches in the prefix tree or in the suffix tree, data to display a visual indication of a prefix string and a suffix string in the visualization interface that form a matching sequence of prefix string, search term, and suffix string that originate together in the source text, for each of one or more matching sequences that are connected through the selected branch.

The details of one or more embodiments are set forth in the accompanying drawings and the description below. Other features, objects, and advantages will be apparent from the description and drawings, and from the claims.

DETAILED DESCRIPTION

There are set forth herein examples of a method, computing system, and computer program product for providing a combined word tree text visualization interface on a computing device or in a computing environment. Various embodiments disclosed herein may analyze bodies of text and render a combined word tree text visualization interface that potentially provides a great deal of information and context within a single visualization diagram, as well as powerful tools for using the interface to explore additional information and context about the source text, among various other features and advantages. Various illustrative features and advantages of a combined word tree text visualization system are further described below with reference to FIGS. 1-7.

A combined word tree text visualization interface according to various implementations disclosed herein seeks to provide rich visualization information on the context of a target word or phrase by providing both preceding and subsequent branches of text in one view, and by providing a means to show complete phrases or sentences within that visualization interface based on user selections of certain branches within the visualization interface, without having to narrow the branches to a single leaf.

A user may enter a search term that includes a target word or phrase, or some other string of text. A combined word tree text visualization interface visually represents the search term in context from each of several occurrences of the search term within a source text of potentially very large size, which may be a document or book of any size or type, a collection of books or documents of any size or type, a corpus, or any other collection of text. The combined word tree text visualization interface visually represents the search term in context within the middle of both preceding and subsequent text, represented with a prefix tree extending to one side of the search term, and a suffix tree extending to the other side of the search term, within the same combined tree diagram, in which the search term forms a central node that connects the prefix tree and the suffix tree. Unlike a simple string search within a text that provides a simple list of the different appearances of the search term within the text, a combined word tree text visualization interface provides a user with a visual indication of the frequency of associated words or phrases within the text, for each of several combinations of associated words or phrases when they occur. An illustrative example of such a combined word tree text visualization interface is depicted in FIG. 1.

Figure 1:
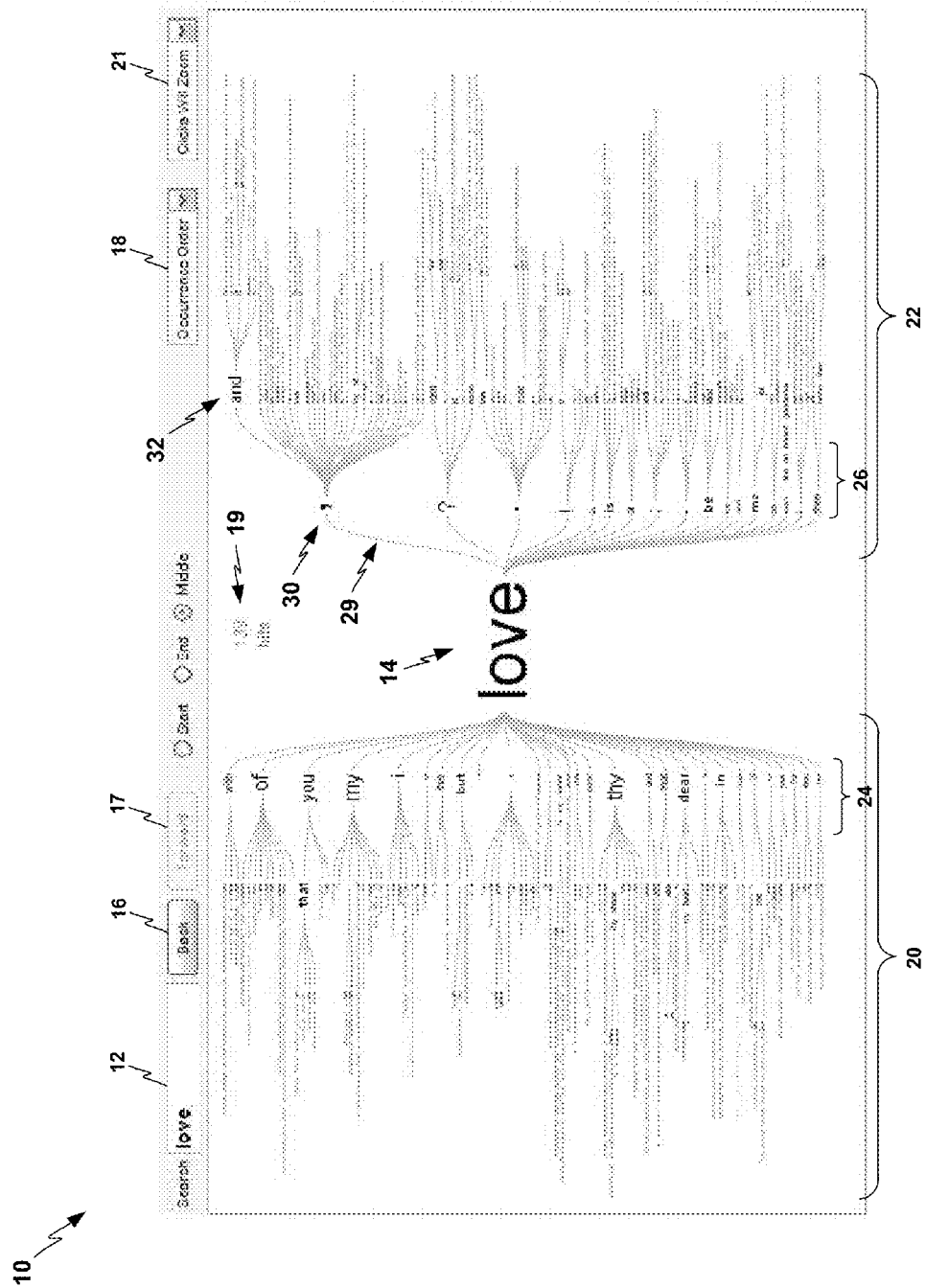
FIG. 1 depicts a screenshot of an example combined word tree text visualization interface as it may be displayed on a computing device display screen.

FIG. 1 depicts a screenshot of a combined word tree text visualization interface 10 as it may be displayed on a computing device display screen, according to various illustrative examples. In the example depicted in FIG. 1, a user has entered the word "love" as a search term in a search field box 12, with reference to a source text, in this case, the complete text of the play "Romeo and Juliet" by William Shakespeare. The search term "love" is accordingly displayed as the central node 14 of the combined word tree text visualization interface 10, which for convenience may be referred to simply as visualization interface 10. The word "love" is rendered in a size proportional to its frequency, or the total number of times it occurs within the source text. The specific size relationship may be that the central node word is portrayed in a size proportional to the square root of the number of times the word occurs in the source text, for example, but any of various specific proportional relationships may be used. The central node 14 connects a prefix tree 20 that extends to the left side of central node 14, and a suffix tree 22 that extends to a right side of central node 14.

Immediately connected, by branches, to central node 14 are a number of first-level prefix branch nodes 24, each of which is a word or other token that appears immediately before the word "love" in at least one passage of "Romeo and Juliet". A number of second-level prefix branch nodes are connected by branches to the first-level prefix branch nodes, with most of the first-level nodes having several second-level nodes connected to them. Each of the second-level prefix nodes includes a word, phrase, or other one or more tokens that appears immediately preceding the words forming the first-level prefix node and the central node at least once in "Romeo and Juliet". Some of the second-level nodes show additional branching into third-level nodes. Once the branching reaches a point where it forms a unique phrase with no duplication anywhere else in the text of "Romeo and Juliet", a sample of text extends outwardly as a leaf node, i.e. an end-point node with no further branching. The sample of text may include a significant amount of text, such as the entirety of the beginning of the sentence from the play up to the point of branching into a node, or extending into a preceding sentence from the play, thereby providing a substantial amount of context for the search term and the branch node words. Therefore, a user may follow any of the leaf nodes starting from the far left edges of prefix tree 20 and, following the branches from the selected leaf node to the central node 12, read a passage of "Romeo and Juliet" that leads up to an occurrence of the word "love".

Similarly, suffix tree 22 includes a number of first-level suffix nodes 26, each of which is a word, punctuation mark, or other token that occurs immediately subsequent to the word "love" in the text of "Romeo and Juliet", and together representing all of the tokens that occur immediately after the word "love" throughout the text of "Romeo and Juliet". In another example, only a subset of all possible suffix strings may be selected or displayed, as may also be done with the prefix tree, and as is described in more detail further below. A number of second-level suffix branch nodes are connected by branches to the first-level suffix branch nodes, with, in this case, all of the first-level nodes having two or more second-level nodes connected to them.

In the case of the first-level suffix node 30 for the comma, this node 30 has twenty-eight second-level suffix nodes branching off from it, indicating that there are instances in the source text of "Romeo and Juliet" where the word "love" followed by a comma, is followed by any of twenty-eight different immediately subsequent tokens—and some of those define combined phrases that appear several times in the source text. This is shown, for example, with the second-level suffix node 32 for the word "and" branching from the first-level suffix node 30 for the comma, which together with central node 14 indicates the sequence "love, and", i.e. the sequence of the word "love" followed by a comma and the word "and". As indicated, this sequence itself branches to five different third-order suffix nodes, four of which are leaf nodes and one of which is a fourth-level branch node, branching to two different fifth-level leaf nodes.

A user may therefore follow any branching sequence through the suffix tree 22 starting from the word "love" at the central node 12, and read a sequence of text that appears subsequent to the word "love" somewhere in the source text of the play "Romeo and Juliet". The words or other tokens in the prefix tree 20 and the suffix tree 22 are also displayed in a size proportional to their frequency in the source text, as well, so that, for example, the words "of", my", and "thy" among the first-level prefix nodes 24 are displayed in fairly large size, while the comma, question mark, and exclamation mark tokens are displayed in a fairly large size among the first-level suffix nodes 26, indicating the relatively high frequency of these tokens in the corresponding positions relative to the search term "love" in the text of "Romeo and Juliet". The combined word tree text visualization interface 10 therefore provides a visualization in a single glance of the surrounding context, both preceding and subsequent, of the word "love" in all of its occurrences in the text of "Romeo and Juliet". The combined word tree text visualization interface 10 makes it easy to pick out repetition among words or phrases on either side of the search term, that either begin or end with the word "love" in the text of "Romeo and Juliet".

Visualization interface 10 also provides the capability to go further, and invoke visualizations of repetition among phrases that include the search term "love" including both the text preceding the search term together with the text subsequent to the search term, and thereby unify the information from both the prefix tree 20 and the suffix tree 22, by enabling the branches anywhere in the combined tree, including in the prefix tree 20 and the suffix tree 22, to be user-selectable. When a user selects any one of the branches in the combined tree, the interface provides visual indications, such as distinguishing colors in which it renders node words and branches, for all of the matching sequences of prefix string, search term, and suffix string, that form a phrase, sentence, or other string together in the text of "Romeo and Juliet". This enables a user to see, at the same time, a number of different matching sequences from the left-most prefix leaf node to the right-most suffix leaf node in the visualization interface, each rendered in a different color or with some other distinguishing visual indication. A user may enter inputs to make a selection, or to select a branch or a node, for example by moving a pointer to the position of the branch or the node and clicking a button on the mouse, or simply hovering the mouse over the position. On a device with a touchscreen, the user may make a selection by touching the screen at the position of a branch or node, for example. These and various other input devices may allow user selections in different implementations For example, a user may select the branch 30 that extends between the first-level comma node and the second-level node for the word "and" in the suffix tree 22, and visualization interface 10 will highlight, colorize, or other apply distinguishing visual indications on each of the six strings of text forming a matching sequence through the prefix tree 20 and the search term at the central node 14, through the first-level node for the comma, the branch 30, and the second-level node for the word "and" in the suffix tree 22, and then branching out among the five different third-level nodes and two fourth-level nodes connected to the branch 30. The visualization interface 10 may colorize the text and/or branches of one each of these six matching sequences in red, orange, yellow, green, blue, and purple, instead of a default of black, for example. Because the sequences will overlap at least on the central node 14, the branch between central node 14 and the first-level suffix node for the comma, the comma itself at this node, and on the branch 30 between the first-level suffix node for the comma and the second-level suffix node for the word "and", the visualization interface 10 may either combine the colors in these nodes and branches, or apply one or a subset of them in these nodes and branches, which will still clearly differentiate or distinguish these nodes and branches from the default and from the remainder of the combined word tree outside of the connections of the selected branch 30.

With these sequences thus highlighted or colorized, a user will be able to see, in one glance, a phrase or sentence of significant length surrounding each occurrence of the sequence "love, and", in the text of Romeo and Juliet, including "the fearful passage of their death-mark'd love, and the continuance of their parents' rage, which, but their children's end, nought could remove, is now the two hours' traffic of our stage", and "she hath forsworn to love, and in that vow do I live dead that live to tell it now", and so forth through all six examples. (All examples omit capital letters in this example rendering.) The user may, in one view, examine all six of these examples of text, and compare them within the greater context of all 139 sequences of text in which the word "love" is embedded in the text of "Romeo and Juliet". (Visualization interface 10 displays a hit count 19 indicating the total number of hits, i.e. occurrences, of the search term in the selected text, in this example.)

Visualization interface 10 may render these colorized sequences within the complete visualization view as depicted in FIG. 1, or may omit some or all of the sequences that remain unselected once the user has selected a branch. Whether or not visualization interface 10 retains the full view of the non-selected sequences while displaying the colorized sequences that include the selected branch, may be a user-selectable option. The visual indications presented for sequences defined by a selected branch are further described below, after introducing additional features in reference to FIG. 1.

Visualization interface 10 may be rendered by a program that may run as a web application on a server, or as a local application on a computing device. In either case, the server or computing device, or a processor thereof, may therefore receive a search term and identify instances of the search term in a source text. Then, for at least a set of the instances of the search term identified in the source text, the device providing the visualization interface 10 may identify a prefix string comprising a plurality of tokens preceding the search term in the source text, and identify a suffix string comprising a plurality of tokens subsequent to the search term in the source text. These tokens may include words, punctuation marks, or any other tokens in the source text. For example, for the original search term "love" and the source text of "Romeo and Juliet", the device may search the source text of "Romeo and Juliet" and in one instance in which it finds the word "love", the device identifies "she hath forsworn to" as a prefix string and ", and in that vow do I live dead that live to tell it now" (including the comma, in this example) as a suffix string. For this particular instance, the identified prefix string, the search term, and the identified suffix string then form a matching sequence that reads "she hath forsworn to love, and in that vow do I live dead that live to tell it now", in the form in which the prefix string, search term, and suffix string originate together in the source text.

The device may identify a set of such instances of the search term in the source text, where the set may be anywhere from zero instances to all the instances that occur in the source text, i.e. 139 instances in this case. The device then provides data to display visualization interface 10 such that it includes the search term within a combined tree diagram, such as is depicted in FIG. 1, that includes a prefix tree 20 extending to a first side of the search term 14, and a suffix tree 22 extending to a second side of the search term 14. The device may provide data to display the visualization interface 10 in the form of a server providing data over a network connection to a client computing device, or in the form of a computing device's processor providing data to the computing device's display screen or other components, for example. While it's natural for the prefix tree 20 to extend to the left side of the search term 14 and for the suffix tree 22 to extend to the right side of the search term 14 in this English-language example, the reverse may be implemented for examples in which the visualization interface 10 is provided in languages that are typically written from right to left, such as Farsi and Urdu, for example, while left-to-right, right-to-left, or vertical orientations may be enabled for a visualization interface 10 in Chinese, Japanese, or Korean, for example.

Prefix tree 20 then displays, in a tree diagram format, at least a set of the prefix strings for the instances of the search term in the source text, and suffix tree 22 displays, in a tree diagram format, at least a set of the suffix strings for the instances of the search term in the source text. Prefix tree 20 and suffix string 22 may display all of the prefix strings and suffix strings, or may omit some according to a set of user options or an algorithm for showing only more common or more important strings in cases where the prefix tree or suffix tree become too dense to be legible, for example. As indicated above, prefix tree 20 includes tokens that are shared in common among the prefix strings as nodes connected to adjacent tokens by branches, and suffix tree 22 likewise includes tokens that are shared in common among the suffix strings as nodes connected to adjacent tokens by branches.

These branches in both prefix tree 20 and suffix tree 22 are user-selectable in visualization interface 10. The device providing the visualization interface 10 may respond to receiving a user input selecting one of the branches by providing data to display a visual indication of a prefix string and a suffix string in the visualization interface that form a matching sequence of prefix string, search term, and suffix string that originate together in the source text, for each of one or more matching sequences that are connected through the selected branch, as further discussed below with reference to FIGS. 3 and 4.

Visualization interface 10 also includes navigation buttons, including a back button 16 and a forward button 17, that enable user inputs for navigating backward or forward among a history of states of the visualization interface, based on a history of user inputs entered to the visualization interface, such as search terms, selected nodes to add to the search term, selected branches, or other user inputs entered to the visualization interface.

Visualization interface 10 also includes a user-selectable menu 18 that provides different user-selectable options for arranging the ordering of the prefix tree and the suffix tree in visualization interface 10. The options in ordering menu 18 include an occurrence order, a frequency order, and an alphabetical order. The occurrence order arranges the dual tree diagram of the visualization interface 10 in an order in which the sequences occur in the source text; the frequency order arranges the dual tree diagram of the visualization interface 10 in an order of frequency in which the sequences occur in the source text, such as from most frequent to least frequent; and the alphabetical order arranges the dual tree diagram of the visualization interface 10 in alphabetical order.

For ordering the leaf nodes, visualization interface 10 may structure the leaf nodes consistently with the structure of the branches. For example, the first leaf node instance would be placed at the top, but the leaf node directly below it may or may not be the second phrase in the source text from among all of the leaf nodes. It will, however, be the second occurring leaf node from among the leaf nodes that share the same branch. Therefore, in this example, visualization interface 10 prevents branches from crossing each other to make the visualization more readable. Ordering menu 18 may also apply any of these ordering arrangements specifically to either prefix tree 20 or suffix tree 22, so that, for example, a user may select to arrange the visualization interface 10 with the suffix tree 22 arranged in order of occurrence of the suffix strings in the source text.

Visualization interface 10 may also provide independent scrolling for the prefix tree 20 and the suffix tree 22, so that in examples or in views in which the visualization interface 10, or at least one of the prefix tree 20 or the suffix tree 22, runs long enough or is portrayed in a large enough view to run off the view depicted in a single screen, a user may scroll the prefix tree 20 up or down, and may scroll the suffix tree 22 up or down, independently of each other.

Visualization interface 10 may also enable each of the nodes to be user-selectable to be added to the search term at the central node 14, to narrow down the central node 14 and thereby prune the combined word tree. Visualization interface 10 includes drop-down menu 21 that provides different options for what type of functions a user can operate by clicking with a mouse, or otherwise entering a user input selecting a position on visualization interface 10. In the view of FIG. 1, drop-down menu 21 is set to a "clicks will zoom" setting, indicating that clicking on another node will zoom in on a combination of the selected node with the search term 14 at the central node, along with any intervening nodes, and reorganize the tree diagram in visualization interface 10 based around the new string of words as a new search term to "zoom in" on. For example, in this setting for clicks to operate to zoom in on a combination of nodes, a user may select the first-level suffix node 32 for the word "be", and visualization interface 10 may merge this first-level suffix node 32 into the central node 14, resulting in the phrase "love be" as a new search term, and then pare away all of the combined word tree except those branches and nodes that include the phrase "love be". The result of this operation is depicted in FIG. 2.

Drop-down menu 21 may also provide other user-selectable options, such as a "highlighter" mode that enables user selections of words to highlight them with visual indicators, such as a bright highlighting color surrounding the selected words. Another example option that drop-down menu 21 may provide is a "see all paths" mode, in which a user may select one of the nodes in the tree diagram, and visualization interface 10 displays, highlights, or otherwise visually indicates all the prefix and suffix branches that include the selected node and the search term.

Figure 2:
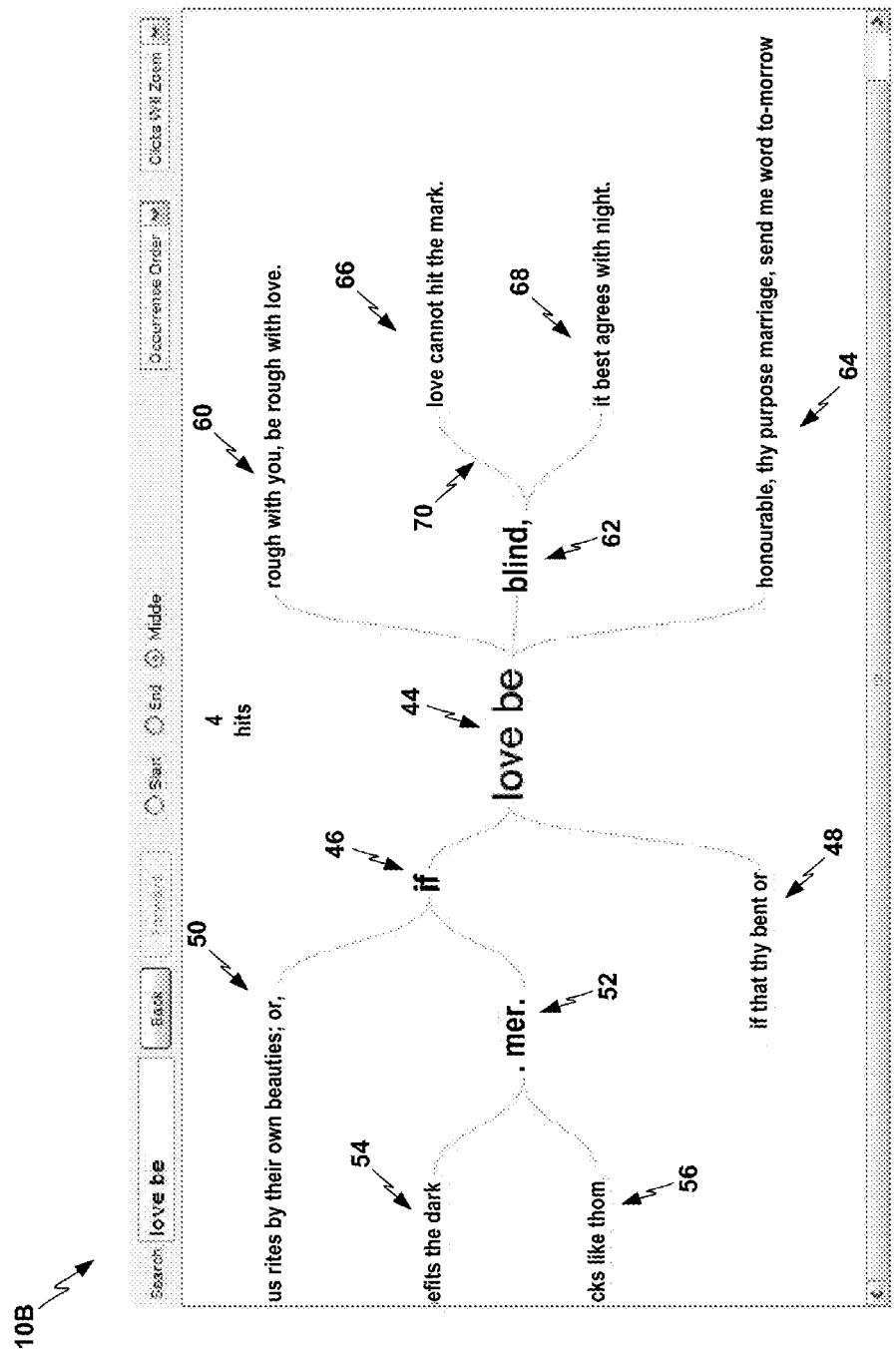
FIG. 2 depicts a screenshot of an example combined word tree text visualization interface as it may be displayed on a computing device display screen, as modified from the view of FIG. 1 after receiving a user input.

FIG. 2 shows a substantially reorganized visualization interface 10B, which has been refactored to feature only sequences that include the phrase "love be" from throughout the text of "Romeo and Juliet", of which there are only four, as opposed to the 139 sequences displayed by visualization interface 10 in FIG. 1. (That is, visualization interface 10B is visualization interface 10 rendered in a new state based on new input; likewise, different states of visualization interface are labeled 10C and 10D in FIGS. 3 and 4 below to depict further different states of visualization interface 10 based on additional new user inputs.) As seen in FIG. 2, the new prefix tree only has two first-level prefix nodes, one of which is a leaf node 48 and only one of which is a branching node 46 which leads to two second-level prefix nodes, one a leaf node 50 and the other being another branching node 52 that branches to two third-level leaf nodes 54, 56. (Branching node 52, unlike most nodes in this example, does not include dialogue, but rather "mer." for the abbreviated name of the character Mercutio, indicating in the text of the play that the subsequent line belongs to a different character than the previous line.) The new suffix tree has three first-level suffix nodes, including two leaf nodes 60, 64, and one branching node 62 leading to two second-level leaf nodes 66, 68. FIG. 2 thereby also provides a more simplified example of the visualization interface in which to illustrate the branching nodes and leaf nodes, as well as the selection of branches and the visual indications of matching sequences defined by the selected branches.

FIG. 2 therefore illustrates the operation of a user refining the search term in order to drill down to a finer level of detail than in FIG. 1. FIG. 2 and the following FIGS. 3 and 4 also further illustrate the feature of user selection of a branch in the combined word tree, and the visual indications rendered in response to a selected branch. For example, a user may select the branch 70 that extends between first-level suffix node 62 and its two leaf nodes 66, 68. The resulting visual indications are depicted in FIG. 3.

Figure 3:
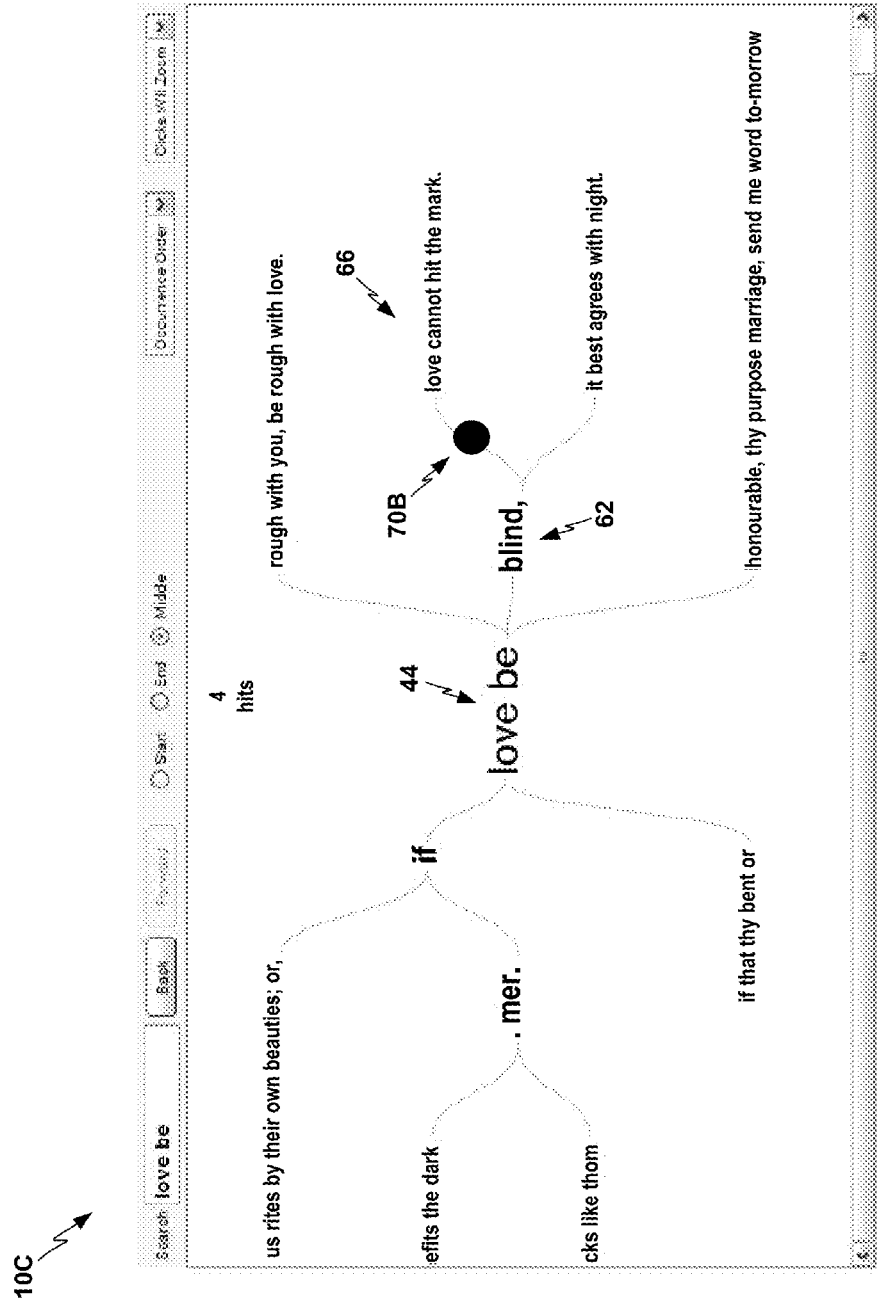
FIG. 3 depicts a screenshot of an example combined word tree text visualization interface as it may be displayed on a computing device display screen, as modified from the view of FIG. 2 after receiving another user input.

FIG. 3 depicts a screenshot of another example combined word tree text visualization interface 10C (i.e., "visualization interface 10C") as it may be displayed on a computing device display screen. Visualization interface 10C is in a new state after receiving a user input selecting branch 70, now labeled 70B and displaying a visual indication that it has been selected by the user, connecting suffix nodes 62 and 66. While the visual indication displayed on branch 70B is depicted as a filled-in circle on visualization interface 10C depicted in FIG. 3, it may take any form in other examples, which may include rendering branch 70B in a different and distinguishing color, or highlighting around it with a distinguishing color, or using any other kind of distinguishing shape or pattern on or around branch 70B, or any other distinguishing characteristic.

Besides displaying that branch 70B has been selected by the user, visualization interface 10C also displays distinguishing visual indications, represented in FIG. 3 with bold print font for the node text and thicker lines for the branches, for the entire matching sequence of text from the source text that includes branch 70B. In this case, the selected branch leads to leaf node 66, so that it defines only one unique matching sequence of text from the source text. Visualization interface 10C visually indicates each portion of this unique matching sequence through the nodes and branches in which it is displayed in the combined tree diagram, so that a user can easily follow along and read the entire original sequence of text, "blind is his love and best befits the dark. mercutio: if love be blind, love cannot hit the mark", including a significant amount of contextual text surrounding the search term "love be" from both before and after the occurrence of the search term in the source text. The text has all been rendered in lower case in this example, to simplify the identification in common of different occurrences of the same word that may be capitalized in one instance and not in another, such as with the word "if" between the two occurrences from which node 46 is drawn. In various examples, visualization interface 10C may also incorporate upper and lower case from the source text, and may have an option whether or not to be case sensitive.

The user can also easily compare this sequence to other sequences from the source text that share more or less material with it surrounding the search term, including other sequences that share in common the strings "mercutio: if love be", "if love be", and "if love be blind", as well as those sequences that share in common only the search term "love be". The user can therefore see the matching sequence for the selected branch 70B in context compared with similar sequences from throughout the source text, including both similarities and differences in the material both preceding and subsequent to the phrase defined as the search term.

As with branch 70B, visualization interface 10C may use distinguishing colors, shapes, patterns, or any other form of visual indications. While the visual indications are illustratively represented with bold print font for the node text and thicker lines for the branches in the example of FIG. 3, visualization interface 10C may also use distinguishing colors in which to render the text font and/or the branches, or use distinguishing colors to highlight around the text font and/or branches, or use underlining, italics, larger font size, all capital letters, flashing patterns or other animations, or any combination of these, or any other distinguishing feature, as the visual indications for the text and/or the branches applicable to a user-selected branch in the combined tree diagram. In another example implementation, for example, visualization interface 10C may display the node text for the matching sequence defined by the selected branch 70B rendered in orange font color and in bold print, and display the branches for the matching sequence defined by the selected branch 70B rendered in orange color and in a thicker size relative to the other branches, while the node text and branches for the combined tree diagram outside of the matching sequence defined by the selected branch may be rendered in black, and in normal font and relatively thinner lines. The user may then make a different selection, the results of which are depicted in FIG. 4.

Figure 4:
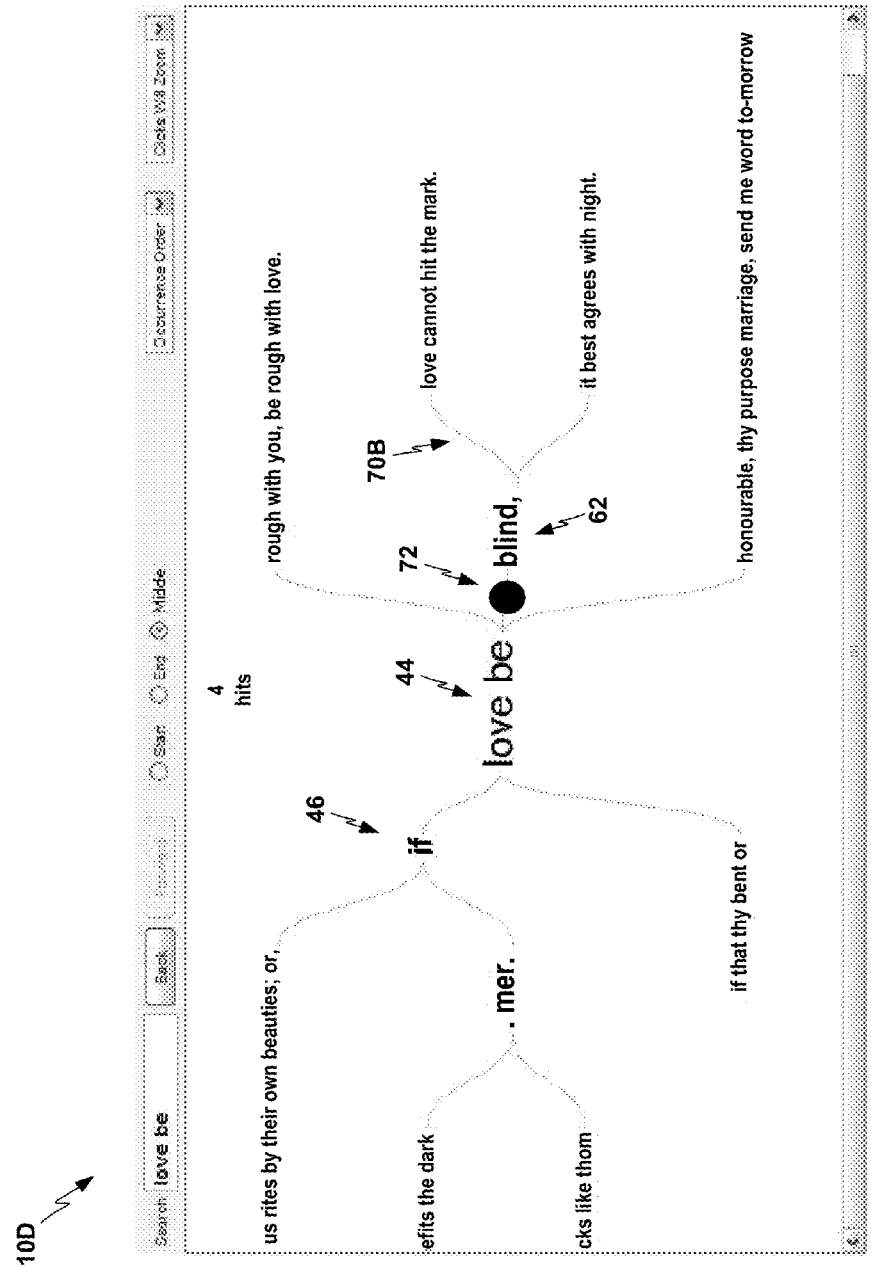
FIG. 4 depicts a screenshot of an example combined word tree text visualization interface as it may be displayed on a computing device display screen, as modified from the view of FIG. 3 after receiving another user input.

FIG. 4 depicts a screenshot of another example combined word tree text visualization interface 10D (i.e., "visualization interface 10D") as it may be displayed on a computing device display screen. Visualization interface 10D is in another new state after receiving a user input selecting a different branch, branch 72 connecting the central node 44 to the first-order suffix node 62. Visualization interface 10D displays a visual indication that it has been selected by the user. As with FIG.

3, while the visual indication displayed on branch 72 is depicted as a filled-in circle on visualization interface 10D depicted in FIG. 4, it may take any form in other examples, which may include rendering branch 72 in a different and distinguishing color, or highlighting around it with a distinguishing color, or using any other kind of distinguishing shape or pattern on or around branch 72, or any other distinguishing characteristic.

In this case, the selected branch 72 does not link to a leaf node, and so it does not uniquely define a single selected matching sequence of text among the combined tree diagram of visualization interface 10D. Instead, in this instance, the selected branch 72 defines two different matching sequences that pass through it, both of which include the phrase "love be blind", defined by connecting the central node 44 with the search term "love be" with the first-order suffix node for the word "blind". In this case, visualization interface 10D displays the nodes and branches for both of the matching sequences defined by the selected branch 72 with unique, distinguishing visual indicators, that uniquely distinguish the nodes and branches of each of the individual matching sequences, from each other and from the remainder of the combined tree map displayed in visualization interface 10D.

These distinguishing visual indicators are depicted with different patterns of dashed and dotted lines in FIG. 4 as just one illustrative example, while in other examples, visualization interface 10D may again use distinguishing colors in which to render the text font and/or the branches, or use distinguishing colors to highlight around the text font and/or branches, or use underlining, italics, larger font size, all capital letters, flashing patterns or other animations, or any combination of these, or any other distinguishing feature, as the visual indications for the text and/or the branches applicable to a user-selected branch in the combined tree diagram.

As another illustrative example using color, visualization interface 10D may depict both matching sequences with bold print for the node text and thicker lines for the branches, as well as using a unique color for each of the two matching sequences. For example, visualization interface 10D may use orange to render the text and branches for the first matching sequence, "lovers can see to do their amorous rites by their own beauties; or, if love be blind, it best agrees with night", and use green for the second matching sequence, "blind is his love and best befits the dark. mercutio: if love be blind, love cannot hit the mark". Visualization interface 10D may use any of a variety of means for applying color to the nodes and branches that are shared in common, including the central node 44, as well as, in this case, the first-level prefix node 46 for the word "if" and the first-level suffix node 62 for the word "blind". For example, visualization interface 10D may apply parallel lines for the branches and parallel underlining for the node text, with one line for each of the two colors; or it may apply a dashed line that alternates between the two colors; or use some other pattern that combines the two colors in a regular pattern for the nodes and branches shared in common between the two sequences.

In another example, visualization interface 10D may apply one of the colors for one of the matching sequences to the nodes and branches shared in common among the two sequences defined by the selected branch. So for example, if visualization interface 10D uses orange to render the nodes and branches unique to the first matching sequence, and green to render the nodes and branches unique to the second matching sequence, it may simply use either orange or green to render the nodes and branches in common between the two matching sequences, again potentially in combination with the bold font and thicker branch lines. In this example, it is still clear for a user to see and be able to follow each of the matching sequences through the combined tree diagram.

In yet another example, visualization interface 10D may apply a third color to the nodes and branches shared in common among the two matching sequences. For example, visualization interface 10D may render the nodes and branches unique to the first sequence in red and the nodes and branches unique to the second sequence in blue, and render the nodes and branches shared in common between the first and second sequences in purple. Visualization interface 10D may apply any type of visual indications that distinguish each of the matching sequences defined by the selected branch.

While the example of FIG. 3 has only one matching sequence defined by its selected branch 70B, and the example of FIG. 4 has only two matching sequences defined by its selected branch 72, it may be seen that in large, densely populated visualization diagrams, such as depicted for visualization interface 10 in FIG. 1, there are cases in which a user input for selection of a single branch may define any number of matching sequences that run through that selected branch. For example, referring again to FIG. 1, a user may select branch 29 connecting the central node 14 for the original search term "love" with the first-level suffix node 30 for the comma. In this case, the user selection of branch 29 defines thirty-five different matching sequences running across the combined tree diagram visualization interface 10, connecting thirty-five different prefix leaf nodes with thirty-five different suffix leaf nodes, interspersed with a pattern of partially shared nodes and branches more complex than those shown in FIG. 4.

Visualization interface 10 may, in this example as well, render uniquely distinguishing visual indicators for each of the thirty-five matching sequences running across the combined tree diagram defined by the selected branch 29. For example, it may apply thirty-five different unique colors for the nodes and branches of the various matching sequences, keeping relatively higher-contrast combinations of colors grouped together to aid in distinguishing, and use a subset of the applicable colors for rendering nodes and branches shared among multiple sequences.

Visualization interface 10 may therefore provide a large amount of contextual information, in a single view, about the appearance of the string defined by the selected branch 29, in this case a string defined as the original search term "love" followed by a comma, in each of a large number of different appearances in the source text. This contextual information includes a significant amount of surrounding text both before and after the string defined by the selected branch, for each of the string's occurrences in the source text. Visualization interface 10 may also offer suggestions or options for adding one of the first-level prefix nodes or suffix nodes to the search term for the central node 14, or other suggestions or options for drilling down to details of the combined word tree. Visualization interface 10 therefore provides a substantial amount of contextual information about the various occurrences of a search term within a source text, with powerful and flexible tools for visualizing how that search term interrelates with various surrounding textual matter among its different occurrences in the source text.

Visualization interface 10 may be implemented in any of a wide variety of types of software, including as a web application provided from a web server in a browser running on another computing device, or as a stand-alone desktop application or mobile application, for example. In one example, visualization interface 10 may be implemented in a Java applet, and provided by a server for a website and that runs in a browser on a separate computing device. The Java applet may be written in Java or any other language that compiles to Java bytecode, such as Jython, JRuby, or Clojure, for example. In another example, visualization interface 10 may be implemented as a web application using JavaScript, that may run on a server and provide an interface in a browser on a client computing device. The web application may use a server-side JavaScript implementation such as Node.js, for example. An illustrative computing environment for these implementations is depicted in FIG. 5.

Figure 5:
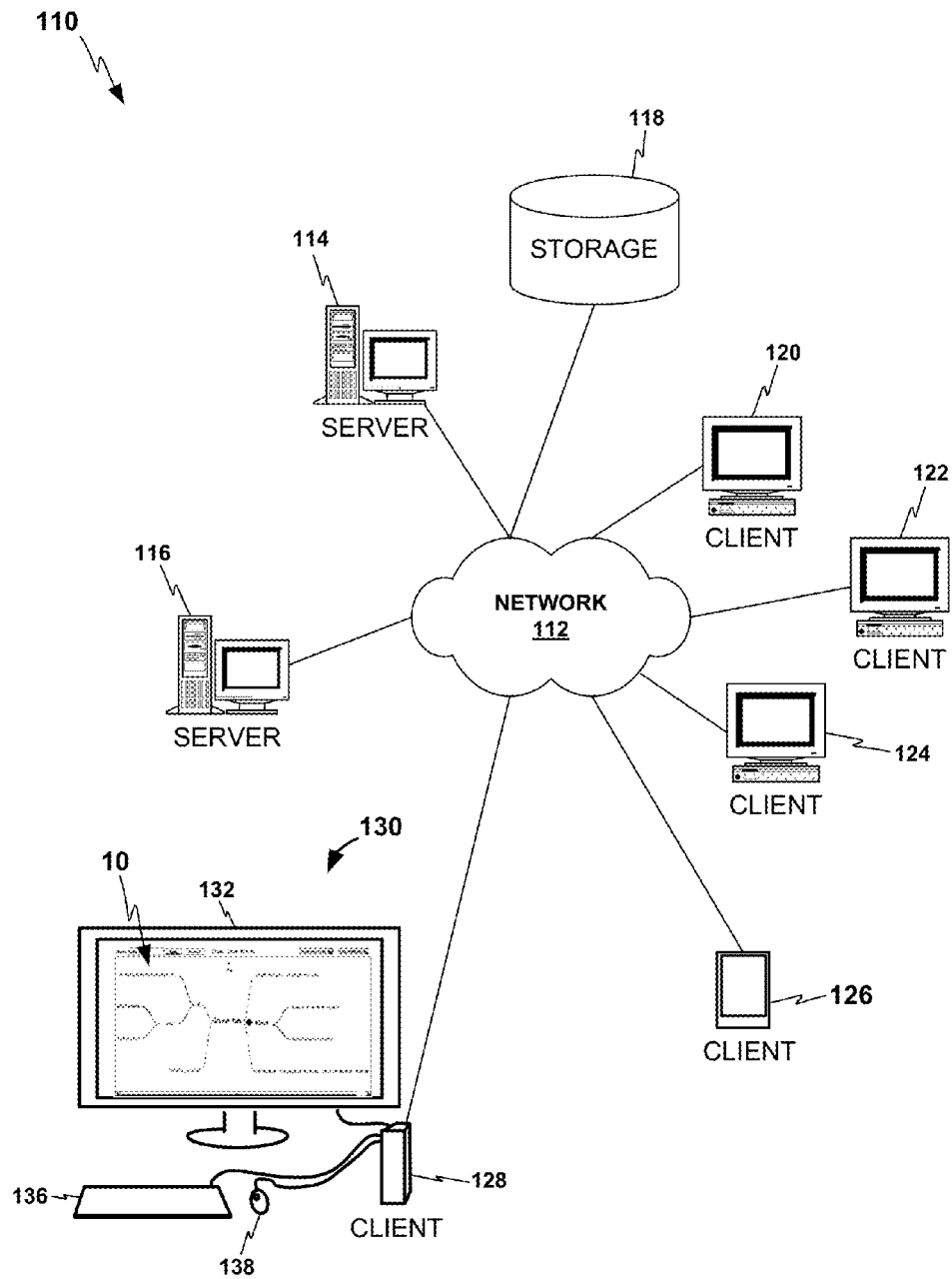
FIG. 5 is a block diagram of an example computing network environment in which a server may provide a combined word tree text visualization interface to client computing devices.

FIG. 5 is a block diagram of a computing network environment 110 in which a combined word tree text visualization system may be used, according to an illustrative example. FIG. 5 depicts a representation of a network of computer systems including one or more computing devices that implement, execute, or embody a combined word tree text visualization system, and provide a combined word tree text visualization interface 10 such as is depicted in and described with reference to FIGS. 1-4 (including in its specific states 10B, 10C, 10D as depicted in each of the figures).

Computing environment 110 includes network 112, that may include one or more networks of any kind that may provide communications links between various devices and computers connected together within computing environment 110. Network 112 may include connections, such as wire, wireless communication links, or fiber optic cables. In the depicted example, server 114, server 116, and storage unit 118 connect to network 112. In one example, network 112 is the Internet with a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Network 112 may also be implemented as a number of different types of networks, such as for example, an intranet, a local area network (LAN), or a wide area network (WAN). FIG. 5 is an illustrative example, and not an architectural limitation for the variety of illustrative examples.

Servers 114 and 116 may include any type of servers, and storage unit 118 may include any type of storage server, storage area network, redundant array of independent discs (RAID), storage device, cloud storage service, or any other type of data storage. In addition, clients 120, 122, 124, 126, and 128 connect to network 112, through any type of wireless and/or hard-line network components or infrastructure. Clients 120, 122, 124, 126, and 128 may be, for example, personal computers, laptop computers, tablet computers, smartphones, or other computing devices. In the depicted example, server 114 may provide any kind of data, including website content, web applications, a web application interface, or downloaded desktop applications to clients 120, 122, 124, 126, and 128. Clients 120, 122, 124, 126, and 128 are computing devices that are clients to server 114 in this example. Computing environment 110 may include additional servers, clients, storage elements, network elements, and various other devices not shown in FIG. 5.

Client computing device 128 is associated with an illustrative personal computing environment 130, as depicted in FIG. 3A, with computing device 128 being connected to network 112, and capable of establishing a network connection to servers 114 and 116 through network 112 and sending requests to servers 114 and 116. Computing environment 130 in this example also includes user input devices in the form of keyboard 136, mouse 138, and monitor 132 rendering a browser window displaying combined word tree text visualization interface 10, as shown in FIGS. 1-4. Client computing device 128 may run a web browser and receive web application data for the combined word tree text visualization web application running on server 114 or server 116, for example. Client computing device 128 renders the corresponding combined word tree text visualization interface 10 in the browser window of the web browser program being rendered on the display screen of monitor 132, in this example. The web browser program running on computing device 128 may provide a runtime for the web application interface. For example, the combined word tree text visualization interface 10 may be written as a Java applet, and the web browser program running on computing device 128 may include a Java Virtual Machine (JVM) or a Java plugin for executing JVM-compatible bytecode. As another example, the combined word tree text visualization web application may be written at least in part in JavaScript, and the browser may include capability for running JavaScript.

Figure 6:
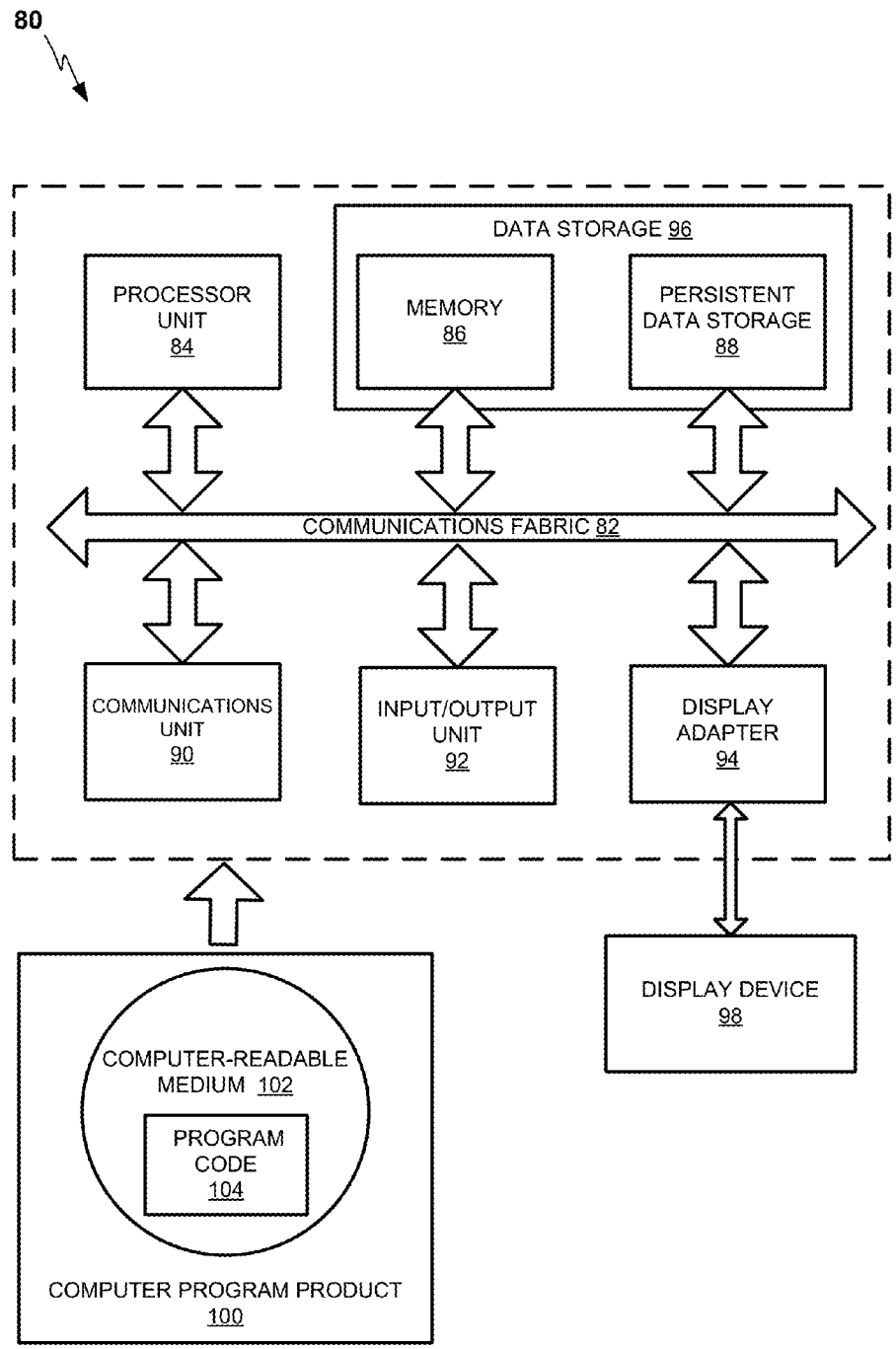
FIG. 6 is a block diagram of an example computing device that may run a combined word tree text visualization program.

FIG. 6 is a block diagram of a computing device 80 that may be used to run a combined word tree text visualization system for providing combined word tree text visualization interface 10, according to an illustrative example. Computing device 80 may be a workstation, server, mainframe computer, notebook or laptop computer, desktop computer, tablet, smartphone, feature phone, or other programmable data processing apparatus of any kind. Computing device 80 of FIG. 6 may represent any of servers 114, 116 or client computing devices 120, 122, 124, 126, and 128 as depicted in FIG. 5, for example. Other possibilities for computing device 80 are possible, including a computer having capabilities or formats other than or beyond those described herein.

In this illustrative example, computing device 80 includes communications fabric 82, which provides communications between processor unit 84, memory 86, persistent data storage 88, communications unit 90, and input/output (I/O) unit 92. Communications fabric 82 may include a dedicated system bus, a general system bus, multiple buses arranged in hierarchical form, any other type of bus, bus network, switch fabric, or other interconnection technology. Communications fabric 82 supports transfer of data, commands, and other information between various subsystems of computing device 80.

Processor unit 84 may be a programmable central processing unit (CPU) configured for executing programmed instructions stored in memory 86. In another illustrative example, processor unit 84 may be implemented using one or more heterogeneous processor systems in which a main processor is present with secondary processors on a single chip. In yet another illustrative example, processor unit 84 may be a symmetric multi-processor system containing multiple processors of the same type. Processor unit 84 may be a reduced instruction set computing (RISC) microprocessor such as a PowerPC® processor from IBM® Corporation, an x86 compatible processor such as a Pentium® processor from Intel® Corporation, an Athlon® processor from Advanced Micro Devices® Corporation, or any other suitable processor. In various examples, processor unit 84 may include a multi-core processor, such as a dual core or quad core processor, for example. Processor unit 84 may include multiple processing chips on one die, and/or multiple dies on one package or substrate, for example. Processor unit 84 may also include one or more levels of integrated cache memory, for example. In various examples, processor unit 84 may comprise one or more CPUs distributed across one or more locations.

Data storage 96 includes memory 86 and persistent data storage 88, which are in communication with processor unit 84 through communications fabric 82. Memory 86 can include a random access semiconductor memory (RAM) for storing application data, i.e., computer program data, for processing. While memory 86 is depicted conceptually as a single monolithic entity, in various examples, memory 86 may be arranged in a hierarchy of caches and in other memory devices, in a single physical location, or distributed across a plurality of physical systems in various forms. While memory 86 is depicted physically separated from processor unit 84 and other elements of computing device 80, memory 86 may refer equivalently to any intermediate or cache memory at any location throughout computing device 80, including cache memory proximate to or integrated with processor unit 84 or individual cores of processor unit 84.

Persistent data storage 88 may include one or more hard disc drives, solid state drives, flash drives, rewritable optical disc drives, magnetic tape drives, or any combination of these or other data storage media. Persistent data storage 88 may store computer-executable instructions or computer-readable program code for an operating system, application files comprising program code, data structures or data files, and any other type of data. These computer-executable instructions may be loaded from persistent data storage 88 into memory 86 to be read and executed by processor unit 84 or other processors. Data storage 96 may also include any other hardware elements capable of storing information, such as, for example and without limitation, data, program code in functional form, and/or other suitable information, either on a temporary basis and/or a permanent basis.

Persistent data storage 88 and memory 86 are examples of physical, tangible, non-transitory computer-readable data storage devices. Data storage 96 may include any of various forms of volatile memory that may require being periodically electrically refreshed to maintain data in memory, but those skilled in the art will recognize that this also constitutes an example of a physical, tangible, non-transitory computer-readable data storage device. Executable instructions are stored on a non-transitory medium when program code is loaded, stored, relayed, buffered, or cached on a non-transitory physical medium or device, including if only for only a short duration or only in a volatile memory format.

Processor unit 84 can also be suitably programmed to read, load, and execute computer-executable instructions or computer-readable program code for a combined word tree text visualization module that analyzes bodies of text and provides a combined word tree text visualization interface 10, as described in greater detail above. This program code may be stored on memory 86, persistent data storage 88, or elsewhere in computing device 80. This program code may also take the form of program code 104 stored on computer-readable medium 102 comprised in computer program product 100, and may be transferred or communicated, through any of a variety of local or remote means, from computer program product 100 to computing device 80 to be enabled to be executed by processor unit 84, as further explained below.

The operating system may provide functions such as device interface management, memory management, and multiple task management. The operating system can be a Unix based operating system such as the AIX® operating system from IBM® Corporation, a non-Unix based operating system such as the Windows® family of operating systems from Microsoft® Corporation, a network operating system such as JavaOS® from Oracle® Corporation, a mobile device operating system such as iOS® from Apple® Inc., or any other suitable operating system. Processor unit 84 can be suitably programmed to read, load, and execute instructions of the operating system.

Communications unit 90, in this example, provides for communications with other computing or communications systems or devices. Communications unit 90 may provide communications through the use of physical and/or wireless communications links. Communications unit 90 may include a network interface card for interfacing with a LAN 16, an Ethernet adapter, a Token Ring adapter, a modem for connecting to a transmission system such as a telephone line, or any other type of communication interface. Communications unit 90 can be used for operationally connecting many types of peripheral computing devices to computing device 80, such as printers, bus adapters, and other computers. Communications unit 90 may be implemented as an expansion card or be built into a motherboard, for example.

The input/output unit 92 can support devices suited for input and output of data with other devices that may be connected to computing device 80, such as keyboard, a mouse or other pointer, a touchscreen interface, an interface for a printer or any other peripheral device, a removable magnetic or optical disc drive (including CD-ROM, DVD-ROM, or Blu-Ray), a universal serial bus (USB) receptacle, or any other type of input and/or output device. Input/output unit 92 may also include any type of interface for video output in any type of video output protocol and any type of monitor or other video display technology, in various examples. It will be understood that some of these examples may overlap with each other, or with example components of communications unit 90 or data storage 96. Input/output unit 92 may also include appropriate device drivers for any type of external device, or such device drivers may reside in the operating system or elsewhere on computing device 80 as appropriate.

Computing device 80 also includes a display adapter 94 in this illustrative example, which provides one or more connections for one or more display devices, such as display device 98, which may include any of a variety of types of display devices, including monitor 132 of FIG. 5. It will be understood that some of these examples may overlap with example components of communications unit 90 or input/output unit 92. Input/output unit 92 may also include appropriate device drivers for any type of external device, or such device drivers may reside in the operating system or elsewhere on computing device 80 as appropriate. Display adapter 94 may include one or more video cards, one or more graphics processing units (GPUs), one or more video-capable connection ports, or any other type of data connector capable of communicating video data, in various examples. Display device 98 may be any kind of video display device, such as a monitor, a television, or a projector, in various examples.

Input/output unit 92 may include a drive, socket, or outlet for receiving computer program product 100, which comprises a computer-readable medium 102 having computer program code 104 stored thereon. For example, computer program product 100 may be a CD-ROM, a DVD-ROM, a Blu-Ray disc, a magnetic disc, a USB stick, a flash drive, or an external hard disc drive, as illustrative examples, or any other suitable data storage technology. Computer program code 104 may include a combined word tree text visualization computer program for providing the combined word tree text visualization interface 10 as described above.

Computer-readable medium 102 may include any type of optical, magnetic, or other physical medium that physically encodes program code 104 as a binary series of different physical states in each unit of memory that, when read by computing device 80, induces a physical signal that is read by processor 84 that corresponds to the physical states of the basic data storage elements of storage medium 102, and that induces corresponding changes in the physical state of processor unit 84. That physical program code signal may be modeled or conceptualized as computer-readable instructions at any of various levels of abstraction, such as a high-level programming language, assembly language, or machine language, but ultimately constitutes a series of physical electrical and/or magnetic interactions that physically induce a change in the physical state of processor unit 84, thereby physically causing processor unit 84 to generate physical outputs that correspond to the computer-executable instructions, in a way that modifies computing device 80 into a new physical state and causes computing device 80 to physically assume new capabilities that it did not have until its physical state was changed by loading the executable instructions comprised in program code 104.

In some illustrative examples, program code 104 may be downloaded over a network to data storage 96 from another device or computer system, such as a server, for use within computing device 80. Program code 104 comprising computer-executable instructions may be communicated or transferred to computing device 80 from computer-readable medium 102 through a hard-line or wireless communications link to communications unit 90 and/or through a connection to input/output unit 92. Computer-readable medium 102 comprising program code 104 may be located at a separate or remote location from computing device 80, and may be located anywhere, including at any remote geographical location anywhere in the world, and may relay program code 104 to computing device 80 over any type of one or more communication links, such as the Internet and/or other packet data networks. The program code 104 may be transmitted over a wireless Internet connection, or over a shorter-range direct wireless connection such as wireless LAN, Bluetooth™, Wi-Fi™, or an infrared connection, for example. Any other wireless or remote communication protocol may also be used in other implementations.

The communications link and/or the connection may include wired and/or wireless connections in various illustrative examples, and program code 104 may be transmitted from a source computer-readable medium 102 over non-tangible media, such as communications links or wireless transmissions containing the program code 104. Program code 104 may be more or less temporarily or durably stored on any number of intermediate tangible, physical computer-readable devices and media, such as any number of physical buffers, caches, main memory, or data storage components of servers, gateways, network nodes, mobility management entities, or other network assets, en route from its original source medium to computing device 80.

Figure 7:
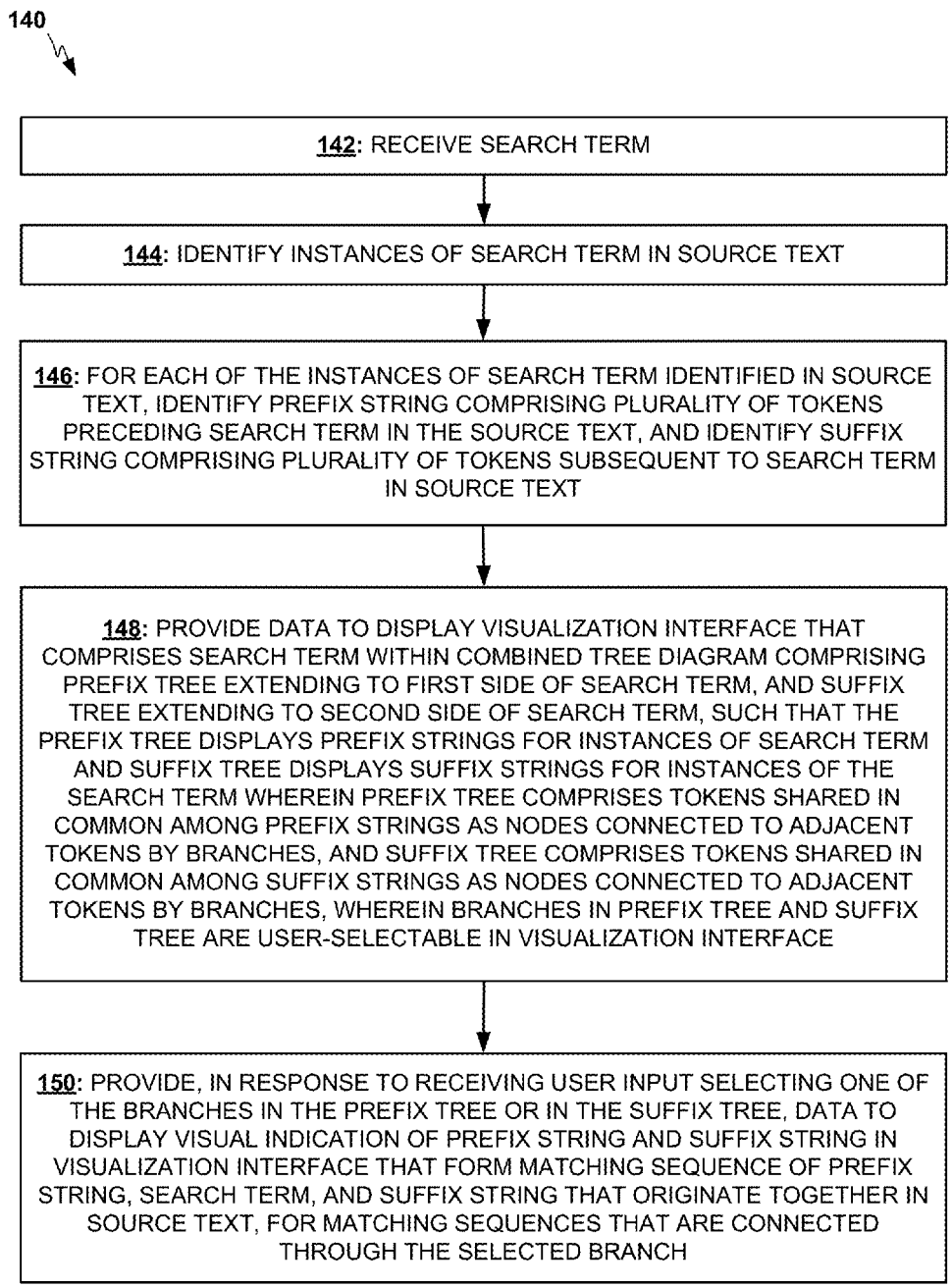
FIG. 7 is a flowchart illustrating operation of an example method for a combined word tree text visualization interface.

FIG. 7 is a flowchart illustrating operation of an example method 140 for a computing device, such as any of the computing devices depicted in FIGS. 5 and 6, to provide a combined word tree text visualization interface 10 such as is depicted in FIGS. 1-4. In method 140, a computing device receives a search term (142) and identifies instances of the search term in a source text (144). For at least a set of the instances of the search term identified in the source text, the computing device identifies a prefix string comprising a plurality of tokens preceding the search term in the source text, and identifies a suffix string comprising a plurality of tokens subsequent to the search term in the source text (146).

The computing device provides data to display a visualization interface that includes the search term within a combined tree diagram that includes a prefix tree extending to a first side of the search term, and a suffix tree extending to a second side of the search term. The prefix tree displays, in a tree diagram format, at least a set of the prefix strings for the instances of the search term in the source text, and the suffix tree displays, in a tree diagram format, at least a set of the suffix strings for the instances of the search term in the source text. The prefix tree includes tokens that are shared in common among the prefix strings as nodes connected to adjacent tokens by branches, and the suffix tree likewise includes tokens that are shared in common among the suffix strings as nodes connected to adjacent tokens by branches. The branches in the prefix tree and the suffix tree are user-selectable in the visualization interface (148).

In response to receiving a user input selecting one of the branches, the computing device provides data to display a visual indication of a prefix string and a suffix string in the visualization interface that form a matching sequence of prefix string, search term, and suffix string that originate together in the source text, for each of one or more matching sequences that are connected through the selected branch (150).

As will be appreciated by one skilled in the art, aspects of the present invention may be embodied as a method, a computing system, or a computer program product, for example. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Furthermore, aspects of the present invention may take the form of a computer program product embodied in one or more computer-readable data storage devices or computer-readable data storage components that include computer-readable medium(s) having computer readable program code embodied thereon. For example, a computer-readable data storage device may be embodied as a tangible device that may include a tangible, non-transitory data storage medium, as well as a controller configured for receiving instructions from a resource such as a central processing unit (CPU) to retrieve information stored at one or more particular addresses in the tangible, non-transitory data storage medium, and for retrieving and providing the information stored at those particular one or more addresses in the data storage medium.

The data storage device may store information that encodes both instructions and data, for example, and may retrieve and communicate information encoding instructions and/or data to other resources such as a CPU, for example. The data storage device may take the form of a main memory component such as a hard disc drive or a flash drive in various embodiments, for example. The data storage device may also take the form of another memory component such as a RAM integrated circuit or a buffer or a local cache in any of a variety of forms, in various embodiments. This may include a cache integrated with a controller, a cache integrated with a graphics processing unit (GPU), a cache integrated with a system bus, a cache integrated with a multi-chip die, a cache integrated within a CPU, or the processor registers within a CPU, as various illustrative examples. The data storage apparatus or data storage system may also take a distributed form such as a redundant array of independent discs (RAID) system or a cloud-based data storage service, and still be considered to be a data storage component or data storage system as a part of or a component of an embodiment of a system of the present disclosure, in various embodiments.

Any combination of one or more computer readable medium(s) may be utilized. The computer readable medium may be a computer readable signal medium or a computer readable storage medium. A computer readable storage medium may be, for example, but is not limited to, an electronic, magnetic, optical, electromagnetic, infrared, electro-optic, heat-assisted magnetic, or semiconductor system, apparatus, or device, or any suitable combination of the foregoing. A non-exhaustive list of additional specific examples of a computer readable storage medium includes the following: an electrical connection having one or more wires, a portable computer diskette, a hard disc, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device, for example.

Program code embodied on a computer readable medium may be transmitted using any appropriate medium, including but not limited to radio frequency (RF) or other wireless, wireline, optical fiber cable, etc., or any suitable combination of the foregoing. Computer program code for carrying out operations for aspects of the present invention may be written in any combination of one or more programming languages, including an object oriented programming language such as Java, Smalltalk, C++, Objective-C, or the like, or other imperative programming languages such as C, or functional languages such as Common Lisp, Haskell, or Clojure, or multi-paradigm languages such as C#, Python, Ruby, or Scala, among a variety of illustrative examples. One or more sets of applicable program code may execute partly or entirely on the user's desktop or laptop computer, smartphone, tablet, or other computing device; as a stand-alone software package, partly on the user's computing device and partly on a remote computing device; or entirely on one or more remote servers or other computing devices, among various examples. In the latter scenario, the remote computing device may be connected to the user's computing device through any type of network, including a local area network (LAN) or a wide area network (WAN), or the connection may be made to an external computer (for example, through a public network such as the Internet using an Internet Service Provider), and for which a virtual private network (VPN) may also optionally be used.

In various illustrative embodiments, various computer programs, software applications, modules, or other software elements may be executed in connection with one or more user interfaces being executed on a client computing device, that may also interact with one or more web server applications that may be running on one or more servers or other separate computing devices and may be executing or accessing other computer programs, software applications, modules, databases, data stores, or other software elements or data structures.

A graphical user interface may be executed on a client computing device and may access applications from the one or more web server applications, for example. Various content within a browser or dedicated application graphical user interface may be rendered or executed in or in association with the web browser using any combination of any release version of HTML, CSS, JavaScript, XML, AJAX, JSON, and various other languages or technologies. Other content may be provided by computer programs, software applications, modules, or other elements executed on the one or more web servers and written in any programming language and/or using or accessing any computer programs, software elements, data structures, or technologies, in various illustrative embodiments.

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, may create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices, to produce a computer implemented process such that the instructions which execute on the computer or other programmable apparatus provide or embody processes for implementing the functions or acts specified in the flowchart and/or block diagram block or blocks.

The flowchart and block diagrams in the figures illustrate the architecture, functionality, and operation of possible implementations of devices, methods and computer program products according to various embodiments of the present disclosure. In this regard, each block in the flowchart or block diagrams may represent a module, segment, or portion of code, which includes one or more executable instructions for implementing the specified logical function(s). It should also be noted that, in some implementations, the functions noted in the block may occur out of the order noted in the figures. For example, two blocks shown in succession may, in fact, be executed substantially concurrently, or the blocks may be executed in a different order, or the functions in different blocks may be processed in different but parallel threads, depending upon the functionality involved. Each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The description of the present disclosure has been presented for purposes of illustration and description, and is not intended to be exhaustive or limited to the disclosure in the form disclosed. Many modifications and variations will be understood by those of ordinary skill in the art based on the concepts disclosed herein. The particular examples described were chosen and disclosed in order to explain the principles of the disclosure and example practical applications, and to enable others of ordinary skill in the art to understand the disclosure for various embodiments with various modifications as are suited to the particular use contemplated. The various examples described herein and other embodiments are within the scope of the following claims.

What is claimed is:

1. A method comprising:
receiving a search term;
identifying instances of the search term in a source text;
for each of the instances of the search term identified in the source text, identifying a prefix string comprising a plurality of tokens preceding the search term in the source text, and identifying a suffix string comprising a plurality of tokens subsequent to the search term in the source text;
providing data to display a visualization interface that comprises the search term within a combined tree diagram comprising a prefix tree extending to a first side of the search term, and a suffix tree extending to a second side of the search term, such that the prefix tree displays, in a tree diagram format, the prefix strings for the instances of the search term identified in the source text, and the suffix tree displays, in tree diagram format, the suffix strings for the instances of the search term identified in the source text, wherein the prefix tree comprises tokens that are shared in common among the prefix strings as nodes connected to adjacent tokens by branches, and the suffix tree comprises tokens that are shared in common among the suffix strings as nodes connected to adjacent tokens by branches, wherein the branches in each of the prefix tree and the suffix tree are user-selectable in the visualization interface; and
in response to receiving a user input selecting one of the branches in the prefix tree or in the suffix tree, and for each of one or more matching sequences that are connected through the selected branch, providing data to display a visual indication of a particular prefix string and a particular suffix string in the visualization interface that form a unique matching sequence of the particular prefix string, the search term, and the particular suffix string that occur together in the source text, wherein each of the one or more matching sequences forms a unique matching sequence from the source text, and wherein the visual indication comprises a unique graphical indicator applied to each unique matching sequence through the corresponding nodes in the prefix tree, the search term, and the corresponding nodes in the suffix tree for each of the unique matching sequences that comprise the search term and the selected branch.

2. The method of claim 1, wherein the unique graphical indicator applied to each unique matching sequence comprises a unique color that is different from a color applied to any of the other unique matching sequences.

3. The method of claim 2, wherein the unique color applied to each unique matching sequence comprises one or more of: a font color in which text for a particular unique matching sequence is rendered; a color in which branches in the given matching sequence are rendered; and a highlighting color that is rendered surrounding or proximate to text or branches of the given matching sequence.

4. The method of claim 1, wherein the nodes in the prefix tree and the suffix tree are also user-selectable in the visualization interface, the method further comprising:
receiving a user input selecting one of the nodes; and
combining a token in the selected node with the search term into a new search term; and
providing data to display an updated visualization interface that comprises the new search term within a new combined tree diagram, comprising a new prefix tree and a new suffix tree, such that the new prefix tree displays, in tree diagram format, the prefix strings for instances of the new search term in the source text, and the new suffix tree displays, in tree diagram format, the suffix strings for instances of the new search term in the source text.

5. The method of claim 1, wherein the selected branch is a first selected branch, the method further comprising:
receiving a user input selecting another one of the branches in the prefix tree or in the suffix tree as a second selected branch; and
for each of one or more matching sequences that are connected through the first selected branch and the second selected branch, providing data to display visual indications of prefix strings and suffix strings in the visualization interface that form a unique matching sequence of a particular prefix string, the search term, and a particular suffix string that occur together in the source text, wherein each of the one or more matching sequences forms a unique matching sequence from the source text, and wherein the visual indication comprises a unique graphical indicator applied to each unique matching sequence through the corresponding nodes in the prefix tree, the search term, and the corresponding nodes in the suffix tree for each of the unique matching sequences that comprise the search term, the first selected branch, and the second selected branch.

6. The method of claim 1, further comprising providing user-selectable options for ordering of the prefix tree and the suffix tree in the visualization interface selectable from among two or more ordering options selected from among an occurrence order, a frequency order, and an alphabetical order.

7. The method of claim 6, wherein the occurrence order, the frequency order, or the alphabetical order may each be selected for the prefix tree or the suffix tree.

8. The method of claim 1, further comprising providing independent scrolling for the prefix tree and the suffix tree.

9. The method of claim 1, further comprising providing navigation buttons for the visualization interface that enable user inputs for navigating backward or forward among a history of states of the visualization interface based on a history of user inputs entered to the visualization interface.

10. A computing system comprising:
one or more processors;
one or more computer-readable tangible storage devices;
program instructions, stored on at least one of the one or more computer-readable tangible storage devices for execution by at least one of the one or more processors, to receive a search term;
program instructions, stored on at least one of the one or more computer-readable tangible storage devices for execution by at least one of the one or more processors, to identify instances of the search term in a source text;
program instructions, stored on at least one of the one or more computer-readable tangible storage devices for execution by at least one of the one or more processors, to identify, for each of the instances of the search term identified in the source text, a prefix string comprising a plurality of tokens preceding the search term in the source text, and to identify a suffix string comprising a plurality of tokens subsequent to the search term in the source text;
program instructions, stored on at least one of the one or more computer-readable tangible storage devices for execution by at least one of the one or more processors, to provide data to display on a display device a visualization interface that comprises the search term within a combined tree diagram comprising a prefix tree extending to a first side of the search term, and a suffix tree extending to a second side of the search term, such that the prefix tree displays, in tree diagram format, the prefix strings for the instances of the search term identified in the source text, and the suffix tree displays, in tree diagram format, the suffix strings for the instances of the search term identified in the source text, wherein the prefix tree comprises tokens that are shared in common among the prefix strings as nodes connected to adjacent tokens by branches, and the suffix tree comprises tokens that are shared in common among the suffix strings as nodes connected to adjacent tokens by branches, wherein the branches in the prefix tree and the suffix tree are user-selectable in the visualization interface; and program instructions, stored on at least one of the one or more computer-readable tangible storage devices for execution by at least one of the one or more processors, to provide, in response to receiving, through a user input device, a user input selecting one of the branches in the prefix tree or in the suffix tree, and for each of one or more matching sequences that are connected through the selected branch, data to display a visual indication of a particular prefix string and a particular suffix string in the visualization interface that form a unique matching sequence of the particular prefix string, the search term, and the particular suffix string that occur together in the source text, wherein each of the one or more matching sequences forms a unique matching sequence from the source text, and wherein the visual indication comprises a unique graphical indicator applied to each unique matching sequence through the corresponding nodes in the prefix tree, the search term, and the corresponding nodes in the suffix tree for each of the unique matching sequences that comprise the search term and the selected branch.

11. The computing system of claim 10, wherein the unique graphical indicator applied to each unique matching sequence comprises a unique color that is different from a color applied to any of the other unique matching sequences.

12. The computing system of claim 11, wherein the unique color applied to each unique matching sequence comprises one or more of: a font color in which text for the given matching sequence is rendered; a color in which branches in the given matching sequence are rendered; and a highlighting color that is rendered surrounding or proximate to text or branches of the given matching sequence.

13. The computing system of claim 10, further comprising:
program instructions, stored on at least one of the one or more computer-readable tangible storage devices for execution by at least one of the one or more processors, to receive a user input selecting one of the nodes; and
program instructions, stored on at least one of the one or more computer-readable tangible storage devices for execution by at least one of the one or more processors, to combine a token in the selected node with the search term into a new search term, and to provide data to display an updated visualization interface that comprises the new search term within a combined tree diagram, comprising a new prefix tree and a new suffix tree, such that the new prefix tree displays, in a tree diagram format, the prefix strings for instances of the new search term in the source text, and the new suffix tree displays, in a tree diagram format, the suffix strings for instances of the new search term in the source text.

14. The computing system of claim 10, wherein the selected branch is a first selected branch, the method further comprising:
program instructions, stored on at least one of the one or more computer-readable tangible storage devices for execution by at least one of the one or more processors, to receive a user input selecting another one of the branches in the prefix tree or in the suffix tree as a second selected branch; and
program instructions, stored on at least one of the one or more computer-readable tangible storage devices for execution by at least one of the one or more processors, to provide data to display visual indications of prefix strings and suffix strings in the visualization interface that form unique matching sequences of prefix string, search term, and suffix string that occur together in the source text, for each of one or more of the unique matching sequences that comprises the first selected branch and the second selected branch.

15. A computer program product comprising:
one or more computer-readable tangible storage devices;
program instructions, stored on at least one of the one or more computer-readable tangible storage devices, to receive a search term;
program instructions, stored on at least one of the one or more computer-readable tangible storage devices, to identify instances of the search term in a source text;
program instructions, stored on at least one of the one or more computer-readable tangible storage devices, to identify, for each of the instances of the search term identified in the source text, a prefix string comprising a plurality of tokens preceding the search term in the source text, and to identify a suffix string comprising a plurality of tokens subsequent to the search term in the source text;
program instructions, stored on at least one of the one or more computer-readable tangible storage devices, to provide data to display a visualization interface that comprises the search term within a combined tree diagram comprising a prefix tree extending to a first side of the search term, and a suffix tree extending to a second side of the search term, such that the prefix tree displays, in tree diagram format, the prefix strings for the instances of the search term identified in the source text, and the suffix tree displays, in tree diagram format, the suffix strings for the instances of the search term identified in the source text, wherein the prefix tree comprises tokens that are shared in common among the prefix strings as nodes connected to adjacent tokens by branches, and the suffix tree comprises tokens that are shared in common among the suffix strings as nodes connected to adjacent tokens by branches, wherein the branches in the prefix tree and the suffix tree are user-selectable in the visualization interface; and
program instructions, stored on at least one of the one or more computer-readable tangible storage devices, to provide, in response to receiving a user input selecting one of the branches in the prefix tree or in the suffix tree, and for each of one or more matching sequences that are connected through the selected branch, data to display a visual indication of a particular prefix string and a particular suffix string in the visualization interface that form a unique matching sequence of the particular prefix string, the search term, and the particular suffix string that occur together in the source text, wherein each of the one or more matching sequences forms a unique matching sequence from the source text, and wherein the visual indication comprises a unique graphical indicator applied to each unique matching sequence through the corresponding nodes in the prefix tree, the search term, and the corresponding nodes in the suffix tree for each of the unique matching sequences that comprise the search term and the selected branch.

16. The computer program product of claim 15, wherein the unique graphical indicator applied to each unique matching sequence comprises a unique color that is different from a color applied to any of the other unique matching sequences.

17. The computer program product of claim 16, wherein the unique color applied to each unique matching sequence comprises one or more of: a font color in which text for the given matching sequence is rendered; a color in which branches in the given matching sequence are rendered; and a highlighting color that is rendered surrounding or proximate to text or branches of the given matching sequence.

18. The computer program product of claim 15, further comprising:
   program instructions, stored on at least one of the one or more computer-readable tangible storage devices, to receive a user input selecting one of the nodes; and
   program instructions, stored on at least one of the one or more computer-readable tangible storage devices, to combine a token in the selected node with the search term into a new search term, and to provide data to display an updated visualization interface that comprises the new search term within a combined tree diagram, comprising a new prefix tree and a new suffix tree, such that the new prefix tree displays, in a tree diagram format, the prefix strings for instances of the new search term in the source text, and the new suffix tree displays, in a tree diagram format, the suffix strings for instances of the new search term in the source text.

19. The computer program product of claim 15, wherein the selected branch is a first selected branch, the method further comprising:
   program instructions, stored on at least one of the one or more computer-readable tangible storage devices, to receive a user input selecting another one of the branches in the prefix tree or in the suffix tree as a second selected branch; and
   program instructions, stored on at least one of the one or more computer-readable tangible storage devices, to provide data to display visual indications of prefix strings and suffix strings in the visualization interface that form unique matching sequences of prefix string, search term, and suffix string that occur together in the source text, for each of one or more of the unique matching sequences that comprises the first selected branch and the second selected branch.

\* \* \* \* \*